S. PETERS.
Syringe.

No. 201,628. Patented March 26, 1878.

Witnesses.
W. G. Terry.
T. S. Peters.

Inventor
Saml. Peters

UNITED STATES PATENT OFFICE.

SAMUEL PETERS, OF COHOES, NEW YORK.

IMPROVEMENT IN SYRINGES.

Specification forming part of Letters Patent No. 201,628, dated March 26, 1878; application filed February 27, 1877.

*To all whom it may concern:*

Be it known that I, SAMUEL PETERS, of Cohoes, in the county of Albany and State of New York, have invented certain new and useful Improvements in Syringes, which improvements are fully set forth in the following specification and accompanying drawings.

The syringe is adapted for hypodermic injections; but the application of my improvements are not particularly confined to syringes of this kind, as they are applicable to syringes for general purposes, and in which the medicated liquid to be injected is carried in the barrel of the syringe, for use as may be required. A graduated syringe-barrel, with a piston adapted to measure from one side thereof, and to place on its opposite side in the same barrel any desired number of minims of the liquid, and then to inject such measured liquid, is new in the practice of medicine and surgery, so far as I know.

The barrel is transparent, or is provided with a transparent scale of minims, and constitutes the supply and working chamber for the piston, the liquid being drawn into the front end of said barrel, transferred to the other end, and then, as required, it is measured through the piston by the scale on the front portion of said barrel in the quantity to be injected.

The piston proper and its stem are jointed, and each has a hole, which, when brought coincident with each other, open communication in the barrel on both sides of the piston, so that by moving the piston out the measure of the liquid will pass from the back to the front end of the barrel, and by breaking the coincidence of the openings the measured liquid can be injected. The lateral hole in the piston is always in view, and to determine its coincidence with the hole in the hollow plug of the stem, a projection is placed on the stem-head to indicate such position.

For hypodermic injections, where the measurements must be exact for each injection, my new syringe is especially advantageous in avoiding the necessity of having to measure the liquid by a separate measure from a separate vial or vessel, and then to suck it into the syringe-barrel for use. This, however, I do not broadly claim.

Figure 1:
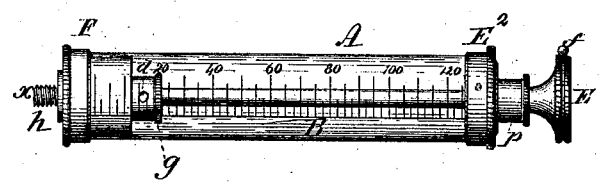
Figure 3:
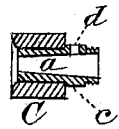
Figure 2:
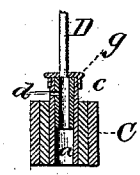
Figure 4:
Figure 5:
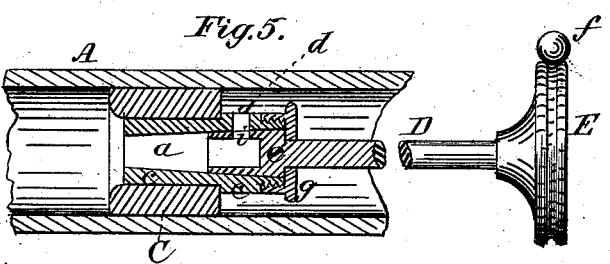

Referring to the drawings, Figure 1 represents my improved measure-syringe; Fig. 2, the piston-head and its hollow stem-plug in section; Fig. 3, the piston-head and its hollow section; Fig. 4, the piston-stem and its hollow plug; and Fig. 5, these two parts in section, enlarged.

The barrel A is of glass, with a scale, B, of minims, so that the measure can be seen.

The piston C proper may be of any suitable material and construction to give a tight packing in the barrel. It has a hollow metallic section, $c$, the bore $a$ of which may be cylindrical or tapering to the outer end, and to which section the packing is permanently fixed. This piston-section $c$ projects beyond the inner end of the packing a suitable distance for a lateral hole, $d$, and to make the connection with the piston-stem. The inner end of the piston-stem D is formed with a hollow plug, $e$, adapted to fit the socket $a$ of the piston-tube $c$, and with a lateral hole, $i$, in a position to be brought into coincidence with the hole $d$ in the piston-tube, to effect a communication through the piston with both ends of its barrel, and by turning the stem D to interrupt the coincidence of these holes and cut off such communication.

A screw-cap, $g$, on the stem screws upon the threaded end of the piston-tube $c$, and unites these parts so as to allow the stem D to be turned independent of the piston-head. The piston-stem passes through a syringe-cap, $E^2$, and has the usual thumb-button E, by which to move the piston in and out. The cap of the syringe has a suitable packing in a recessed neck, P, fitted with a screw-cap, by which to tighten said packing and prevent leakage from the supply-chamber of the barrel.

The cap F at the injecting end of the barrel has a screw-threaded stem, $h$, to which the needle or other instrument is attached for effecting the injection.

As the hollow plug $e$ of the piston-stem D is concealed within the piston-tube $c$, it cannot be seen when their respective holes $d$ $i$ are coincident; but as the piston-tube hole $d$ is always seen, I arrange a mark or sight, $f$, on the stem-head E, in line with the hole $i$ in the stem-plug $e$, so that by turning the plug either way the two holes $d$ $i$ can be brought opposite each other, or closed with each other at once, by a simple turning movement of the stem within the piston-tube. The tapering form of the plug and piston-head bore gives a closely-fitting joint, in connection with the uniting screw-cap $g$.

The mode of using the syringe is simple and easily understood. To fill the chamber of the barrel, place the point $x$ in the medicated solution, and turn the stem-plug so as to close the communication on opposite sides of the piston, and by drawing in the piston the chamber of the barrel in front of said piston is filled; then, placing the finger over the point $x$, and turning the stem-plug to bring its opening coincident with that of the piston-tube, and reversing the movement of the piston, the contents of the barrel are transferred from its injecting end directly behind the piston, and may be there retained for any length of time, with the piston driven up close to the outer end of the syringe, and sealed. When an injection is required the needle is fixed upon the point $x$, the piston-stem turned to bring its hole coincident with that in the piston-tube, and the piston drawn in till the desired number of minims is transferred from the back to the front end of the barrel, when the stem is again turned to close this communication, the needle or other instrument inserted, and the piston pressed out, forcing with it the measured injection. While the needle is still inserted another measure may be made, and injected in the same manner, if desired.

This method of filling the syringe-barrel proper by transferring the liquid through the piston from the front to the back portion of the barrel, and then using such supply from which to make the desired minims through the piston, and again to the front end of the syringe, is new, so far as I know, and gives the advantage of using an ordinary syringe-barrel without complicated appliances requiring separate supply-reservoirs for the liquid.

I claim—

1. The piston-barrel of a syringe, constituting the supply-chamber, and provided with a scale of minims, in combination with a piston furnished with devices to measure from said graduated barrel an ascertained portion of said liquid into and through the piston-plug.

2. The combination, in a syringe, of a graduated barrel having a hollow piston-head with side opening, and a hollow plug on the piston-stem with side opening, and having a rotary movement independent of the piston, with a sight on the stem-head E, whereby to show when the lateral openings are coincident.

3. In a syringe, the piston-head $c$, having way-openings $d$, in combination with the hollow shouldered plug $e$ of the stem D, having way-opening $i$, and the piston-head screw-cap $g$, or equivalent securing device, whereby the two parts are united for operation, as set forth.

SAML. PETERS.

Witnesses:
  W. S. TERRY,
  F. S. PETERS.